(12) United States Patent
Roman et al.

(10) Patent No.: US 10,329,696 B2
(45) Date of Patent: Jun. 25, 2019

(54) CURABLE PREPREGS WITH SURFACE OPENINGS

(71) Applicant: CYTEC INDUSTRIES INC., Princeton, NJ (US)

(72) Inventors: Mark Roman, South Jordan, UT (US); Stephen J. Howard, Chino, CA (US); Jack D. Boyd, Silverado, CA (US)

(73) Assignee: Cytec Industries Inc., Woodland Park, NJ (US)

( * ) Notice: Subject to any disclaimer, the term of this patent is extended or adjusted under 35 U.S.C. 154(b) by 0 days.

(21) Appl. No.: 15/712,481

(22) Filed: Sep. 22, 2017

(65) Prior Publication Data

US 2018/0009176 A1 Jan. 11, 2018

Related U.S. Application Data

(62) Division of application No. 14/135,866, filed on Dec. 20, 2013, now Pat. No. 9,802,358.

(Continued)

(51) Int. Cl.
*D03D 13/00* (2006.01)
*B32B 3/24* (2006.01)
(Continued)

(52) U.S. Cl.
CPC .......... *D03D 13/008* (2013.01); *B32B 3/266* (2013.01); *B32B 5/024* (2013.01); *C08J 5/24* (2013.01); *B29B 15/122* (2013.01); *B29C 66/342* (2013.01); *B32B 5/28* (2013.01); *B32B 27/04* (2013.01); *B32B 27/12* (2013.01); *B32B 27/38* (2013.01); *B32B 2255/02* (2013.01); *B32B 2255/24* (2013.01); *B32B 2255/26* (2013.01); *B32B 2260/021* (2013.01); *B32B 2260/046* (2013.01); *B32B 2262/02* (2013.01); *B32B 2262/0253* (2013.01); *B32B 2262/0269* (2013.01); *B32B 2262/0276* (2013.01); *B32B 2262/10* (2013.01); *B32B 2262/101* (2013.01); *B32B 2262/105* (2013.01);
(Continued)

(58) Field of Classification Search
None
See application file for complete search history.

(56) References Cited

U.S. PATENT DOCUMENTS 3,843,386 A * 10/1974 Ribbans ................ D06B 21/00
427/299
4,213,930 A * 7/1980 Goodrich ............... B29C 70/28
264/135

(Continued)

FOREIGN PATENT DOCUMENTS

DE 19718610 C1 * 6/1998 ............ B64C 21/06
DE 102011084655 A1 * 4/2012 ............ B29B 11/16
(Continued)

*Primary Examiner* — Jeffrey A Vonch
(74) *Attorney, Agent, or Firm* — Thi D. Dang

(57) ABSTRACT

Curable prepregs possessing enhanced ability for the removal of gases from within prepregs and between prepreg plies in a prepreg layup prior to and/or during consolidation and curing. Each curable prepreg is a resin-impregnated, woven fabric that has been subjected to a treatment to create an array of openings in at least one major surface. Furthermore, the location of the openings is specific to the weave pattern of the fabric.

5 Claims, 15 Drawing Sheets

Related U.S. Application Data

(60) Provisional application No. 61/740,560, filed on Dec. 21, 2012.

(51) Int. Cl.
*B32B 5/02* (2006.01)
*B32B 27/04* (2006.01)
*B32B 27/12* (2006.01)
*B32B 27/38* (2006.01)
*C08J 5/24* (2006.01)
*B32B 3/26* (2006.01)
*B29C 65/00* (2006.01)
*B29B 15/12* (2006.01)
*D06M 15/55* (2006.01)
*B32B 5/28* (2006.01)
*D06B 1/04* (2006.01)

(52) U.S. Cl.
CPC ... *B32B 2262/106* (2013.01); *B32B 2305/073* (2013.01); *B32B 2305/076* (2013.01); *B32B 2305/77* (2013.01); *B32B 2307/718* (2013.01); *B32B 2307/724* (2013.01); *B32B 2363/00* (2013.01); *D06B 1/04* (2013.01); *D06M 15/55* (2013.01); *Y10T 428/2481* (2015.01); *Y10T 428/24298* (2015.01); *Y10T 428/24322* (2015.01); *Y10T 428/24331* (2015.01); *Y10T 428/24802* (2015.01); *Y10T 442/20* (2015.04); *Y10T 442/2049* (2015.04); *Y10T 442/2139* (2015.04); *Y10T 442/2369* (2015.04); *Y10T 442/2861* (2015.04); *Y10T 442/2926* (2015.04); *Y10T 442/2951* (2015.04); *Y10T 442/2975* (2015.04); *Y10T 442/2984* (2015.04); *Y10T 442/2992* (2015.04)

(56) References Cited

U.S. PATENT DOCUMENTS

| | | | | |
|---|---|---|---|---|
| 4,221,622 A * | 9/1980 | Slonina | B29C 70/24 | 156/93 |
| 4,562,033 A * | 12/1985 | Johnson | B29C 37/0064 | 156/286 |
| 4,687,685 A * | 8/1987 | Melcher | B29B 15/122 | 118/325 |
| 4,906,506 A * | 3/1990 | Nishimura | B29C 70/22 | 139/383 R |
| 4,943,334 A * | 7/1990 | Medney | B29C 53/564 | 156/169 |
| 5,037,691 A * | 8/1991 | Medney | B29C 53/564 | 361/748 |
| 5,061,545 A * | 10/1991 | Li | B29C 43/222 | 428/156 |
| 5,104,718 A * | 4/1992 | Asada | B29C 37/0064 | 156/196 |
| 5,201,979 A * | 4/1993 | Koba | B29C 70/504 | 100/212 |
| 5,359,850 A * | 11/1994 | Prescott | C04B 38/065 | 60/770 |
| 5,630,874 A * | 5/1997 | Tait | B29B 15/122 | 118/234 |
| 5,641,366 A * | 6/1997 | Hohman | B29C 70/081 | 156/62.8 |
| 5,719,090 A * | 2/1998 | Appelt | B29C 70/086 | 442/19 |
| 5,756,405 A * | 5/1998 | Appelt | B29C 70/22 | 442/19 |
| 5,911,932 A * | 6/1999 | Dyksterhouse | B29B 15/122 | 264/136 |
| 5,928,970 A * | 7/1999 | Appelt | B29C 70/08 | 257/E23.077 |
| 6,013,361 A * | 1/2000 | Seal | B29C 70/44 | 244/133 |
| 6,060,124 A * | 5/2000 | Ikegawa | B29B 15/122 | 118/665 |
| 6,133,167 A * | 10/2000 | Green | B29C 70/465 | 264/241 |
| 6,139,942 A * | 10/2000 | Hartness | B29B 15/105 | 428/297.4 |
| 6,242,090 B1 * | 6/2001 | Green | B29C 70/467 | 428/354 |
| 6,261,675 B1 * | 7/2001 | Hsiao | B29C 70/22 | 428/219 |
| 6,311,542 B1 * | 11/2001 | Sloman | B29C 70/08 | 156/245 |
| 6,391,436 B1 * | 5/2002 | Xu | B29C 70/44 | 428/293.4 |
| 7,135,226 B1 * | 11/2006 | Nagamoto | B29B 15/122 | 428/365 |
| 7,220,453 B2 * | 5/2007 | Nishimura | B29C 70/504 | 427/365 |
| 8,986,487 B2 * | 3/2015 | Stenbaek Nielsen | B29C 70/342 | 156/244.22 |
| 9,096,734 B2 * | 8/2015 | Custer | C08J 5/24 | |
| 2001/0046587 A1 * | 11/2001 | Michael | B32B 3/266 | 428/137 |
| 2002/0117252 A1 * | 8/2002 | Baldwin | B29C 11/16 | 156/178 |
| 2003/0042657 A1 * | 3/2003 | Dublineau | B23K 26/08 | 264/400 |
| 2003/0157309 A1 * | 8/2003 | Ellis | B29C 70/086 | 428/292.1 |
| 2003/0175489 A1 * | 9/2003 | Dolby | B29B 11/16 | 428/298.1 |
| 2003/0219578 A1 * | 11/2003 | Jones | B29C 70/46 | 428/292.1 |
| 2004/0170554 A1 * | 9/2004 | Wadahara | B29B 11/16 | 423/447.2 |
| 2004/0188883 A1 * | 9/2004 | Barron | B29C 70/305 | 264/258 |
| 2004/0192137 A1 * | 9/2004 | Starkey | B29C 70/086 | 442/286 |
| 2004/0195716 A1 * | 10/2004 | Bergmann | B29C 70/44 | 264/101 |
| 2005/0037678 A1 * | 2/2005 | Mack | B29C 70/443 | 442/1 |
| 2005/0085147 A1 * | 4/2005 | Homma | B29C 70/22 | 442/218 |
| 2005/0236736 A1 * | 10/2005 | Formella | B29C 70/46 | 264/258 |
| 2006/0020074 A1 * | 1/2006 | Asada | B29C 37/0075 | 524/494 |
| 2006/0035548 A1 * | 2/2006 | Goto | B29B 15/122 | 442/65 |
| 2006/0130993 A1 * | 6/2006 | Blanton | B29C 70/44 | 164/97 |
| 2006/0172636 A1 * | 8/2006 | Bech | B29B 11/16 | 442/1 |
| 2009/0123717 A1 * | 5/2009 | Goto | B29B 15/122 | 428/213 |
| 2010/0098906 A1 * | 4/2010 | Bongiovanni | B29C 37/0064 | 428/138 |
| 2010/0098927 A1 * | 4/2010 | Boyd | B29C 70/44 | 428/220 |
| 2010/0143145 A1 * | 6/2010 | Jones | B29C 63/0021 | 416/230 |
| 2010/0228001 A1 * | 9/2010 | Mortimer | B29C 70/086 | 528/322 |
| 2011/0027095 A1 * | 2/2011 | Jensen | B29C 70/44 | 416/230 |
| 2012/0114899 A1 * | 5/2012 | Ellis | B29C 70/386 | 428/114 |
| 2013/0004747 A1 * | 1/2013 | Schwarz | B32B 5/02 | 428/196 |
| 2013/0065068 A1 * | 3/2013 | Ellis | B29C 33/68 | 428/447 |

(56) References Cited

U.S. PATENT DOCUMENTS

| | | | | |
|---|---|---|---|---|
| 2013/0143006 A1* | 6/2013 | Ferguson | ............ | B29C 70/342 |
| | | | | 428/189 |
| 2013/0263996 A1* | 10/2013 | Holliday | ............... | B81B 7/0058 |
| | | | | 156/69 |
| 2014/0054830 A1* | 2/2014 | Hindersmann | ....... | B29C 70/023 |
| | | | | 264/570 |
| 2014/0174632 A1* | 6/2014 | Roman | ................ | D03D 13/004 |
| | | | | 156/87 |
| 2014/0261970 A1* | 9/2014 | Moors | .................. | B29C 70/021 |
| | | | | 156/87 |
| 2014/0374018 A1* | 12/2014 | Creaser | ...................... | C08J 5/04 |
| | | | | 156/286 |

FOREIGN PATENT DOCUMENTS

| | | | | |
|---|---|---|---|---|
| EP | 0447223 A1 * | 9/1991 | ............. | B29C 70/08 |
| EP | 1321282 A1 * | 6/2003 | ........... | B29C 70/226 |
| EP | 1920913 A1 * | 5/2008 | ............... | B32B 5/26 |
| EP | 2085212 A1 * | 8/2009 | ........... | B29C 70/465 |
| GB | 1043893 A * | 9/1966 | ............. | B29C 70/16 |
| GB | 2433466 A * | 6/2007 | ............. | B29C 70/44 |
| JP | 63077730 A * | 4/1988 | | |
| JP | 02298520 A * | 12/1990 | | |
| JP | 03049941 A * | 3/1991 | | |
| JP | 03062829 A * | 3/1991 | | |
| JP | 03099833 A * | 4/1991 | | |
| JP | 03207631 A * | 9/1991 | ............. | B29C 70/08 |
| JP | 04039006 A * | 2/1992 | | |
| JP | 04089208 A * | 3/1992 | | |
| JP | 07242756 A * | 9/1995 | | |
| JP | 11114956 A * | 4/1999 | | |
| JP | 2002249605 A * | 9/2002 | | |
| JP | 2005213469 A * | 8/2005 | | |
| JP | 2006044261 A * | 2/2006 | | |
| JP | 2008088276 A * | 4/2008 | | |
| JP | 2010031088 A * | 2/2010 | | |
| JP | 2010195844 A * | 9/2010 | | |
| JP | 2010260888 A * | 11/2010 | | |
| JP | 2012111957 A * | 6/2012 | | |
| WO | WO-8505069 A1 * | 11/1985 | ......... | B29C 35/0222 |
| WO | WO-0027632 A1 * | 5/2000 | ........... | B29C 70/467 |

* cited by examiner

1 Minute

4 Minute 7.5 Minute

Standard

CURABLE PREPREGS WITH SURFACE OPENINGS

The instant application is a divisional application of U.S. application Ser. No. 14/135,866 filed on Dec. 20, 2013, which claims the benefit of U.S. Provisional Patent Application No. 61/740,560 filed on Dec. 21, 2012, both of which are incorporated by reference in their entirety.

BACKGROUND

Fiber-reinforced polymer composites are high-performance structural materials that are composed of a resin matrix and reinforcement fibers. These fiber-reinforced polymer composites have been used for fabricating structural parts that require high strength, and/or low weight, and resistance to aggressive environments. Examples of such structural parts include aircraft components (e.g. tails, wings, fuselages, propellers). The fibers reinforce the matrix resin, bearing the majority of the load supported by the composite, while the resin matrix bears a minority portion of the load supported by the composite and also transfers load from broken fibers to intact fibers. In this manner, these polymeric composites may support greater loads than either the matrix resin or fibers may support alone. Furthermore, by tailoring the reinforcing fibers in a particular geometry or orientation, the composite can be efficiently designed to minimize weight and volume.

Fiber-reinforced polymer composites are traditionally made from sheets of resin-impregnated fibers, also known as prepregs. To form a composite part from the prepregs, a plurality of prepreg layers may be laid up within a mold, and heat may be applied to cause the matrix resin to flow, enabling consolidation of the prepreg layers. The applied heat may additionally cure or polymerize the matrix component.

The consolidation of prepregs to form composites in this manner presents problems, however. Gases such as air may be trapped inside the individual prepreg and between the prepreg layers during layup. Furthermore, volatiles may also evolve during heating and/or curing of the prepregs. These gases are difficult to remove from the layup, as the matrix substantially inhibits movement of the gases and may result in porosity within the final, cured composite. Porosity refers to the voids within the cured composite material. This porosity could further negatively affect the mechanical properties of the final, cured composite.

Techniques have been developed to enhance removal of entrapped gases during composite fabrication, however, problems remain. For example, edge breathers may be employed to apply vacuum to the edge of prepregs in order to draw out gases from the sides of prepreg layers. However, removal of trapped gases from prepregs in this manner is slow and may not substantially remove all of the trapped gases.

SUMMARY

Disclosed herein are curable prepregs possessing enhanced ability for the removal of gases from within prepregs and between prepreg plies in a prepreg layup prior to and/or during consolidation and curing. Each curable prepreg is a resin-impregnated, woven fabric that has been treated to create an array of openings in at least one major surface. Furthermore, the location of the openings is specific to the weave pattern of the fabric.

DETAILED DESCRIPTION

The curable prepreg disclosed herein is composed of a resin-impregnated woven fabric. The woven fabric has two opposing faces and a weaving pattern in which one or more tows in a first weaving direction float over one or more tows in a second weaving direction, then pass under one or more tows in the second weaving direction, wherein a crossover/under location on a face of the fabric is created when a first tow in the first weaving direction crosses over a second tow in the second weaving direction then passes under an adjacent third tow in the second weaving direction, or when the first tow passes under a second tow in the second weaving direction then crossover an adjacent third tow in the second weaving direction. The crossover/under location in this context refers to the portion of the first tow that is going up or going down between the adjacent second and third tows.

The woven fabric for producing the prepreg is made from fiber tows. The tows are interlaced in a weaving pattern in which one or more tows in a first weaving direction float over one or more tows in a second weaving direction, then pass under one or more tows in the same second weaving direction. Due to the weaving configuration, the two major faces of the fabric contain pockets therein, thus, they are neither smooth nor flat throughout.

Figure 1:
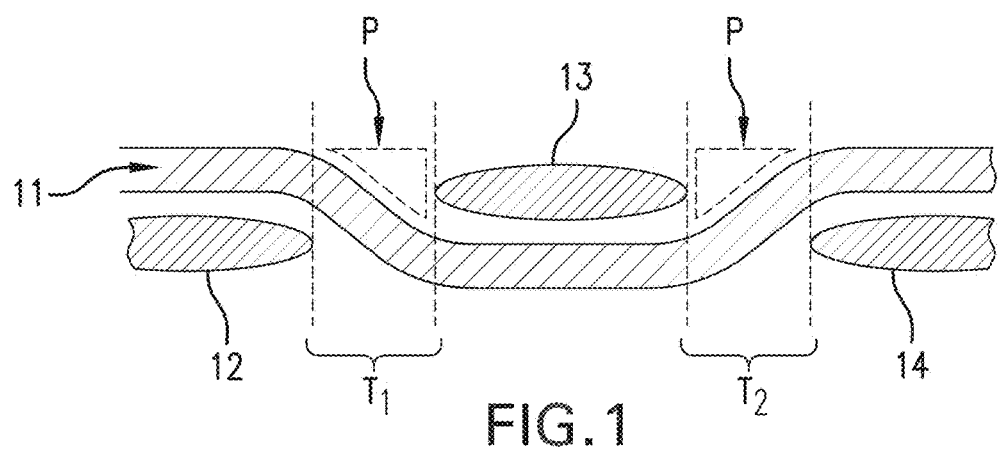
FIG. 1 schematically illustrates a woven fabric portion where fibers tow in one weaving direction passes over and then under tows in the transverse direction.

FIG. 1 schematically illustrates that, due to the weaving configuration of the woven fabric, there are pockets P created in the fabric surface whenever there is a tow portion which crosses over or passes under another transverse tow, i.e., the crossover/under location. Still referring to FIG. 1, going from left to right, when a tow 11 in the first weaving direction crosses over another tow 12 in a second/transverse weaving direction then passes under an adjacent tow 13 in the same second/transverse weaving direction, a "down" tow portion $T_1$ is created, and when tow 11 passes under tow 13 then over an adjacent tow 14 in the second/transverse weaving direction, an "up" tow portion $T_2$ is created. These "up" and "down" tow portions result in the pockets P. In other words, if the fabric is lying on a horizontal, planar surface, the pocket P is created whenever there is a change in elevation of the tow relative to the planar surface. It should be understood that FIG. 1 shows only one example of a fabric weave, and that more complex fabric weaves such as tri-axial weave are contemplated herein.

The curable prepreg further has a curable, hot-melt resin film covering each face of the fabric and penetrates partially through the thickness of the fabric, leaving a middle section of the fabric, in the thickness direction, substantially free of the resin film. An array of openings is formed in one or both of the resin films, wherein each opening exposes the pocket (P in FIG. 1) formed at the crossover/under location in the fabric weave pattern, according to one embodiment. In some embodiments, the resin film is continuous everywhere except where the openings are located. According to another embodiment, the array of openings in the resin is aligned with the interstices in the fabric weave. This embodiment pertains to certain woven fabrics such as plain weave fabric.

The openings are configured to enable gases, such as air, to flow from the middle section of the fabric to at least one outer surface of the prepreg, or from at least one outer surface of the prepreg to the middle section, or from one outer surface of the prepreg to an opposite surface, or combination thereof. The openings also enable gas transfer as well as establishment of vacuum which provides the driving force for the resin to impregnate vacuum-rich areas.

The openings disclosed herein are specific to the fabric weave, unlike prepregs with surface openings formed by conventional mechanical techniques, which are used to form global hole pattern or random hole pattern.

For the purposes herein, the term "curable" means not fully cured, and includes uncured condition.

Each tow is a bundle of fiber filaments. The number of filaments in each bundle may be in multiple of 1000, e.g. 1000-75,000. Tows having less than 15,000 filaments per bundle are contemplated for the intended purposes disclosed herein. The term "filament" refers to a relatively flexible, continuous structure having a high length-to-width ratio.

Fiber materials for the fiber tows include, but are not limited to, glass (including electrical or E-glass), carbon (including graphite), aramid (e.g. Kevlar), high-modulus polyethylene (PE), boron, quartz, basalt, ceramic, polyester, poly-p-phenylene-benzobisoxazole (PBO), and combinations thereof. For producing high performance composite materials, e.g. materials for aerospace application, fibers having tensile strength of greater than 3500 MPa are desirable.

The weaving configuration of the fabric is not limited and may include plain weave, satin weave, twill weave, and the like. In a roll of fabric, the longitudinal tows are in the warp direction and the lateral tows are in the weft direction. In plain weave, the warp and weft tows form a simple crisscross pattern. Each weft tow crosses the warp tow by going over one, then under the next, and so on. The satin weave is characterized by two or more weft tows passing over a single warp tow, or vice versa, two or more warp tows floating over a single weft tow. The twill weave is characterized by passing the weft tow over one or more warp tow and then under one or more warp tows and so on, with an offset between rows to create the characteristic diagonal pattern.

Figure 2:
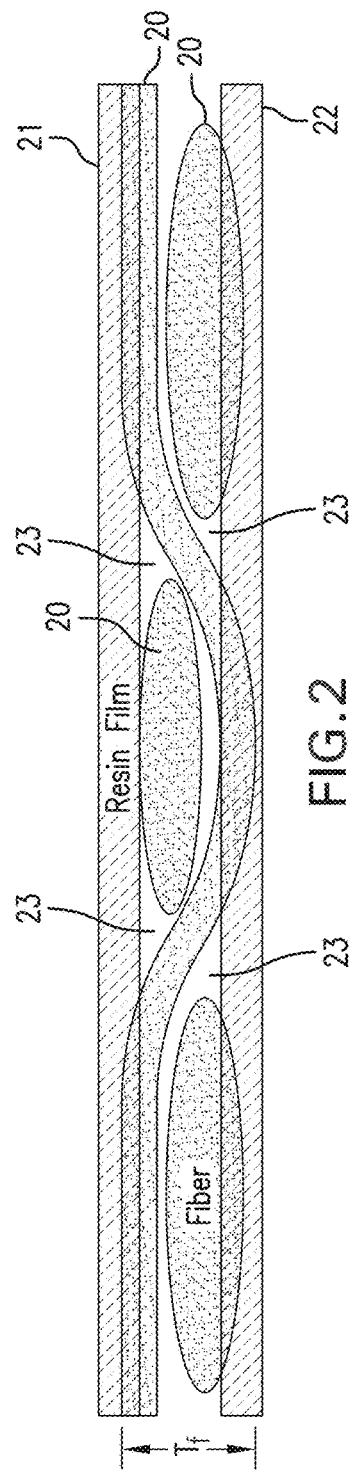
FIG. 2 schematically shows a partially impregnated fabric according to an embodiment of the present disclosure.

FIG. 2 schematically illustrates a partially impregnated fabric (i.e. prepreg ply or prepreg fabric) according to an embodiment of the present disclosure. A fabric with fiber tows 20 is covered on both major faces with an upper resin film 21 and a lower resin film 22. Each resin film penetrates partially through the thickness ($T_f$) of the fabric, leaving a middle section of the fabric substantially free of the resin. After partial impregnation, a plurality of enclosed air pockets 23 is formed between the resin films and the fabric as illustrated in FIG. 2. The enclosed air pockets coincide with the pockets formed at the crossover/under locations in the fabric weave.

The weight ratio of fabric-to-matrix resin in the curable, porous prepreg may be varied, as dictated by the application. In one embodiment, the weight fraction of the fabric may range from 20 wt. % to 80 wt. %, on the basis of the total weight of the prepreg. In another embodiment, the weight fraction of fabric in a porous prepreg is less than 20 wt. %, when the porous prepreg is used as a surfacing film on a composite substrate or a prepreg layup. The fraction of the prepreg occupied by the matrix resin may also be varied as desired. In certain embodiments, the matrix resin may occupy between about 20 wt. % to 80 wt. % of the prepreg on the basis of the total weight of the prepreg.

Prepregging Method

According to one embodiment, the method for making the curable prepreg disclosed above includes partially impregnating a woven fabric with a curable matrix resin followed by a thermal treatment to create an array of surface openings. The method for partially impregnating the woven fabric with a matrix resin is not limited, but a "hot-melt" prepregging method is preferred. In general, this prepregging method is characterized by impregnating a fabric ply with a hot-melt resin composition, in molten form, to yield a partially impregnated prepreg. Impregnation may be done by sandwiching a fabric ply between two resin films and pressing the obtained laminate by hot plates, heated rollers, or by a method in which the laminate is pressed between hot metal belts. Alternatively, the fabric is laminated to a resin film on one side only, leaving the other side substantially free of resin.

As an example, a curable, hot-melt resin composition may be applied in the form of a thin resin film onto a release paper, and the resulting resin film released therefrom is laminated and formed on a fabric ply. Heat is applied to lower the viscosity of the resin film so that it is in a molten state and can penetrate the fabric to a desired level, preferably only partially through the fabric in order to leave a central dry portion. It should be understood that the elevated temperature applied during impregnation is lower than the onset curing temperature of the hot-melt resin. Sufficient pressure is also applied during lamination so that the resin film penetrates partially through the thickness of the fabric ply, thereby resulting in the fabric ply being partially impregnated with the resin composition in the thickness direction. The matrix resin remains uncured immediately after impregnation. For some embodiments, the resin film applied on each face of the fabric may have a film weight of 10-200 gsm (g/cm$^2$), and the fabric may have a fabric areal weight (FAW) of 100-600 gsm. After partial impregnation, a continuous resin film covers one or both major faces of the fabric and penetrates partially through the thickness of the fabric, leaving the middle section of the fabric substantially free of the resin.

Figure 3:
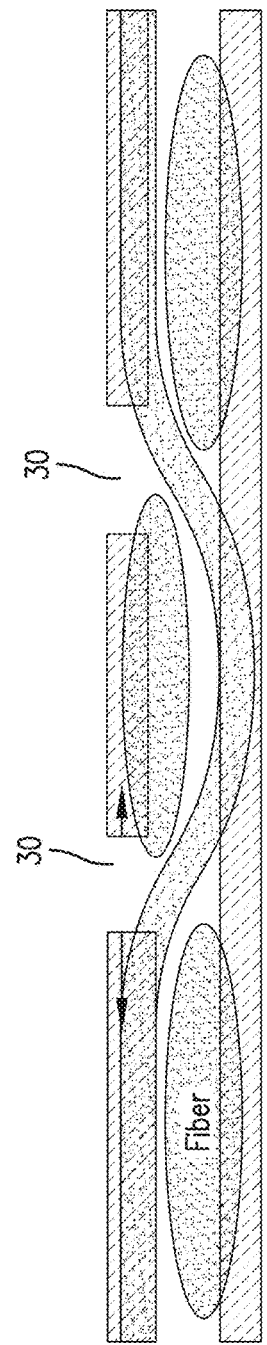
FIG. 3 schematically shows openings created in one surface of a prepreg according to an embodiment of the present disclosure.
Figure 4:
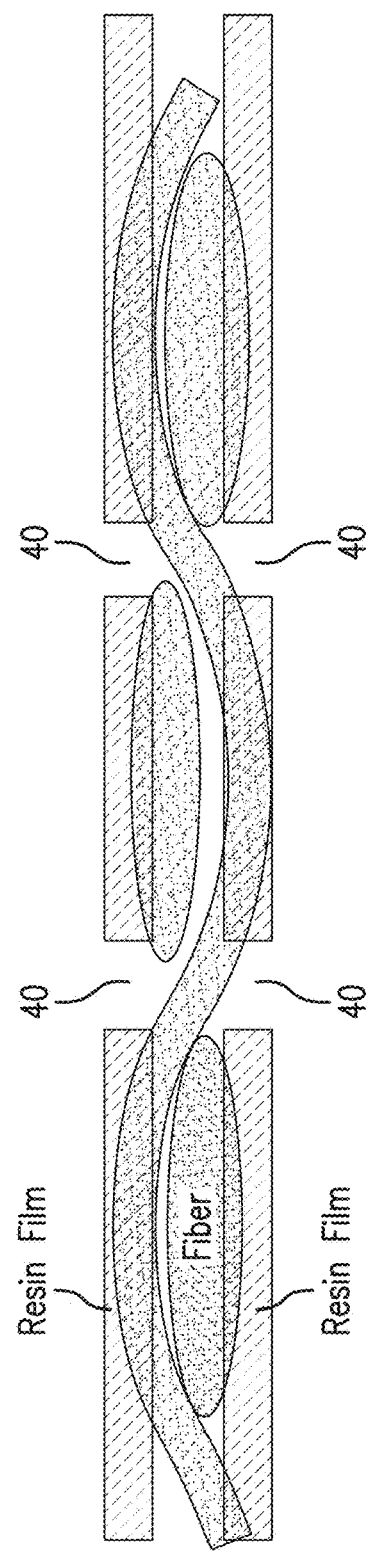
FIG. 4 schematically shows openings created in opposite surfaces of a prepreg according to an embodiment of the present disclosure.

During the thermal treatment, a release or backing paper is left on the exposed surface of the prepreg resin film and heat is applied until the resin film becomes flowable. In certain embodiments, the resin viscosity during thermal treatment is less than 500 Poise at 90° C. Heating is carried out until the resin film portions over the air pockets break open, creating openings in the resin film that correspond to locations of the air pockets. The resin film breaks up by dewetting from the release film surface with resin moving laterally towards areas adjacent to the pocket. In some cases, the resin film breaks away at the edges of the air bubble and moves laterally inward, leaving a minor drop of resin that is removed when the release paper is peeled from the prepreg. The openings may be created in one surface of the prepreg as illustrated in FIG. 3 (openings 30), or in both opposing surfaces of the prepreg as illustrated in FIG. 4 (openings 40). As a result of the thermal treatment, the openings create fluid passages for transporting air or other gases from the outer surface(s) of the prepreg to the middle section of the fabric.

The thermal treatment for creating openings in the prepreg may be carried out as a post-treatment after the fabric has been partially impregnated with the resin films by a standard prepregging process. Alternatively, the thermal treatment may be done in-situ during the prepregging process. It should be understood that the elevated temperature applied during thermal treatment is lower than the onset curing temperature of the matrix resin, and is used to initiate the flow of resin in order to open the enclosed air pockets.

Figure 5:
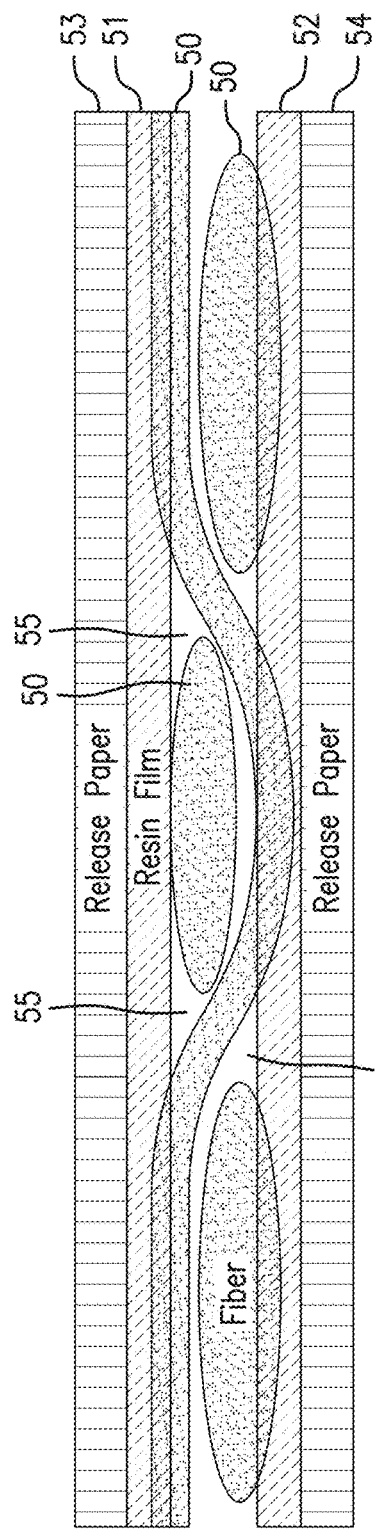
FIG. 5 schematically shows a partially impregnated prepreg according to an embodiment.
Figure 6:
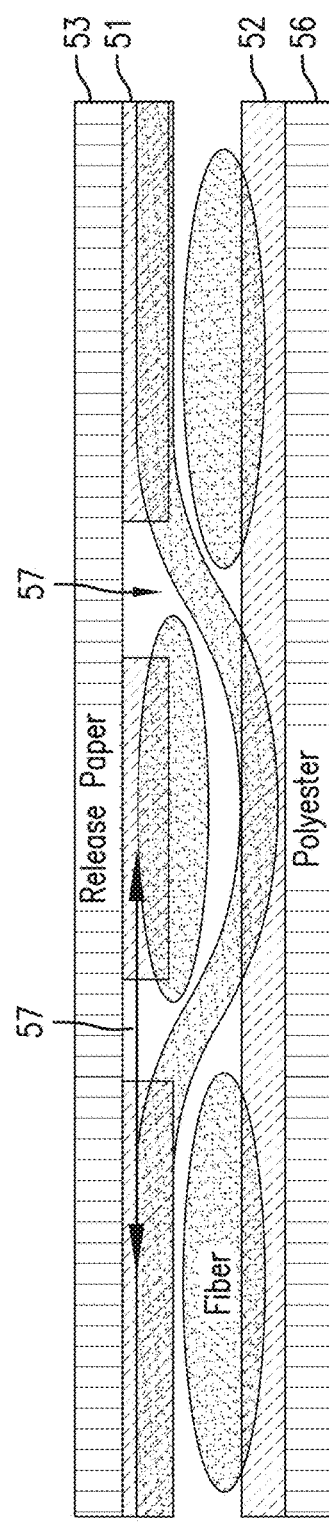
FIG. 6 shows the prepreg of FIG. 5 after thermal treatment.

In one embodiment, a resin-impregnated satin weave fabric is subjected to a post-treatment to create an array of openings. Referring to FIG. 5, a satin weave fabric 50 is sandwiched between an upper resin film 51 and a lower resin film 52. The upper resin film 51 is formed on a release paper 53 and the lower resin film 52 is formed on a release (or backing) paper 54. The release paper may be coated with a silicone film. The resulting laminate is subjected to hot-pressing to form a partially impregnated prepreg, for example, in a prepregging machine. After resin impregnation, air pockets 55 are created below the resin film. Next, referring to FIG. 6, the release paper 54 that is attached to the lower resin film 52 is replaced with a polyester film 56. The polyester film is placed on one side after removal of one of the release papers to facilitate rolling up the final prepreg. Still referring to FIG. 6, the partially impregnated prepreg with the release paper and polyester film thereon is then heated in a heating cycle whereby the resin portions of the upper resin film 52 that lie over the air pockets break open and move/flow away from the air pockets. As a result, openings 57 are created in the resin film 51. Heat treatment may be carried out by exposing the prepreg to a heat source, which is set to a pre-determined temperature, for a selected time period. The prepreg may be stationary during heat exposure, or may be moving through a heating zone via a continuous process. Alternatively, other heating sources may be employed such as Hot Plate, Laser, heated drum, ultrasonic, hot air jet, etc.). The temperature and time period of the heat treatment may be varied depending on the minimum resin viscosity to enable flow and the sufficient time for flow to occur. Thinner resin films flow faster, thus higher film weights require more time. As an example, the post-treatment may be applied to a roll of prepreg material, in the form of a continuous sheet that has been formed via a standard continuous prepreg manufacturing method. In such post-treatment, the continuous prepreg is unwound and continuously conveyed, under tension, through a horizontal heating oven where the prepreg is exposed to heat, and then wound up onto a take-up roll. Depending on the length of the oven, the heat exposure time versus the conveying speed can be controlled to create the desired openings. In one embodiment, the impregnating resin is a hot melt epoxy-based matrix that is a viscoelastic solid at room temperature (20° C.-25° C.) and is curable within the temperature range of 250° F.-350° F. (121° C.-177° C.); the heating cycle may be carried out for 0.25-20 minutes within the range of 120° F.-250° F. (49° C.-121° C.).

Figure 7:
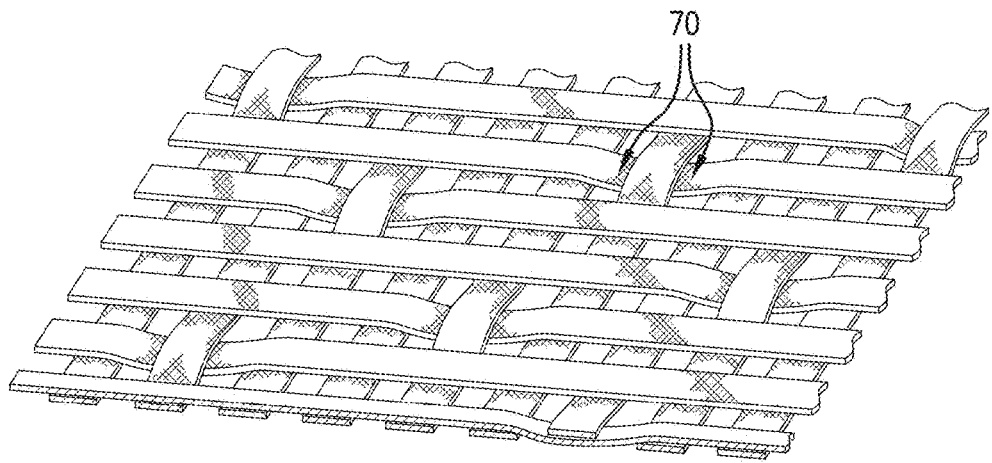
FIG. 7 schematically shows a portion of a satin weave fabric.
Figure 8:
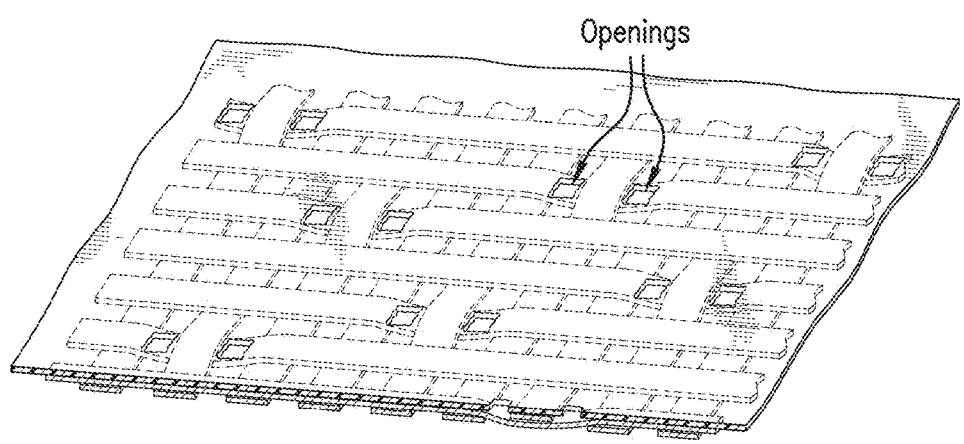
FIG. 8 schematically shows a resin surface with surface openings formed on the satin weave fabric of FIG. 7.

FIG. 7 shows an exemplary satin weave configuration, more specifically, 8-Harness satin weave, and the locations 70 where air pockets may be created when the satin weave fabric is partially impregnated with the resin films as described above. It should be understood that, in reality, the intersecting tows shown in FIG. 7 are actually closer together and more tightly woven. FIG. 8 schematically shows a heat-treated prepreg surface, after resin impregnation and heat treatment as described above in reference to FIGS. 5 and 6, and the locations of the openings in the resin film relative to the crossover/under locations in the fabric weave.

Figure 9:
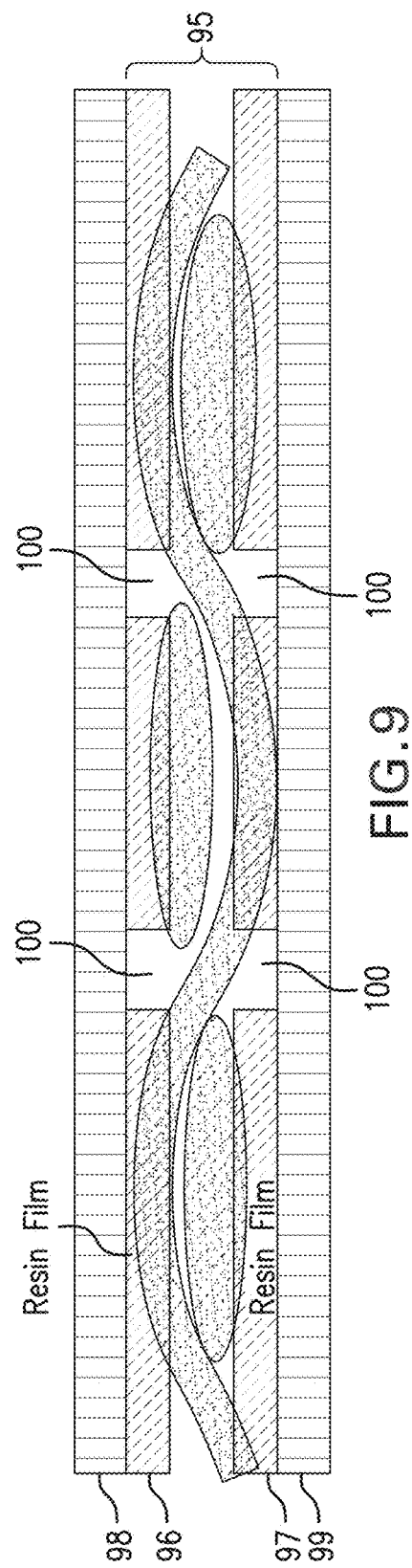
FIG. 9 schematically shows a partially impregnated prepreg that has been subjected to thermal treatment to create surface openings according to another embodiment.

FIG. 9 schematically shows a partially impregnated plain weave fabric 95 that has been subjected to thermal treatment to create openings 100, which are formed through the upper and lower resin films 96, 97. The resin films 96, 97 are supported by release/backing papers 98, 99, respectively.

Figure 10:
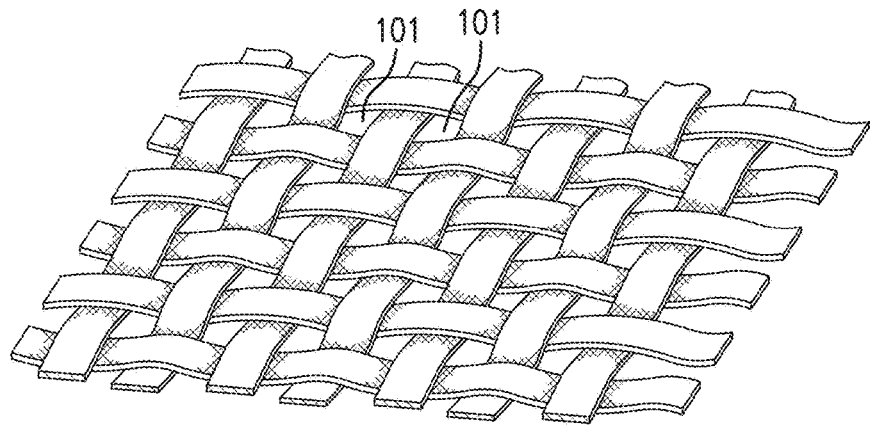
FIG. 10 schematically shows a portion of a plain weave fabric.
Figure 11:
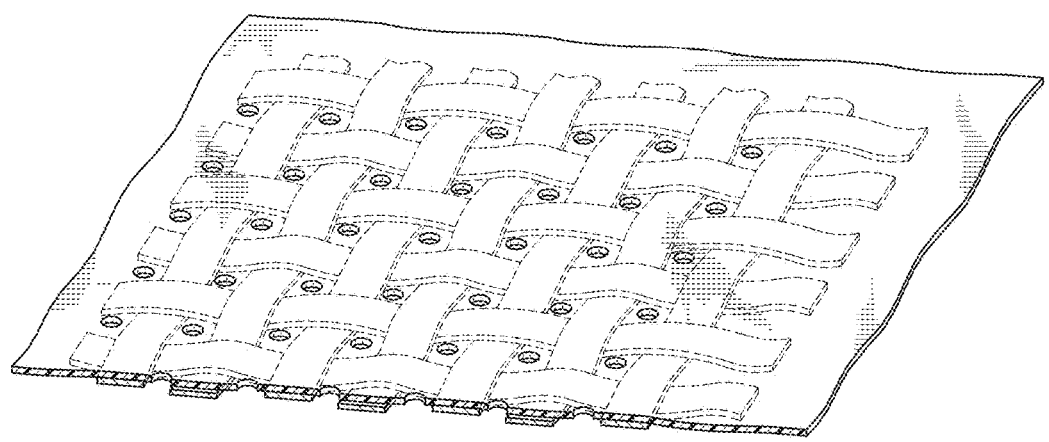
FIG. 11 schematically shows a resin surface with surface openings formed on the plain weave fabric.

FIG. 10 shows an exemplary plain weave fabric and the interstices 101 formed therein. It should be understood that, in reality, the intersecting tows shown in FIG. 7 are actually closer together and more tightly woven. FIG. 11 schematically shows a heat-treated prepreg surface, after resin impregnation and heat treatment as described above in reference to FIG. 9, and the locations of the openings in the resin film relative to the interstices 101 in the fabric weave. Note that the openings are aligned with the interstices 11.

Figure 12:
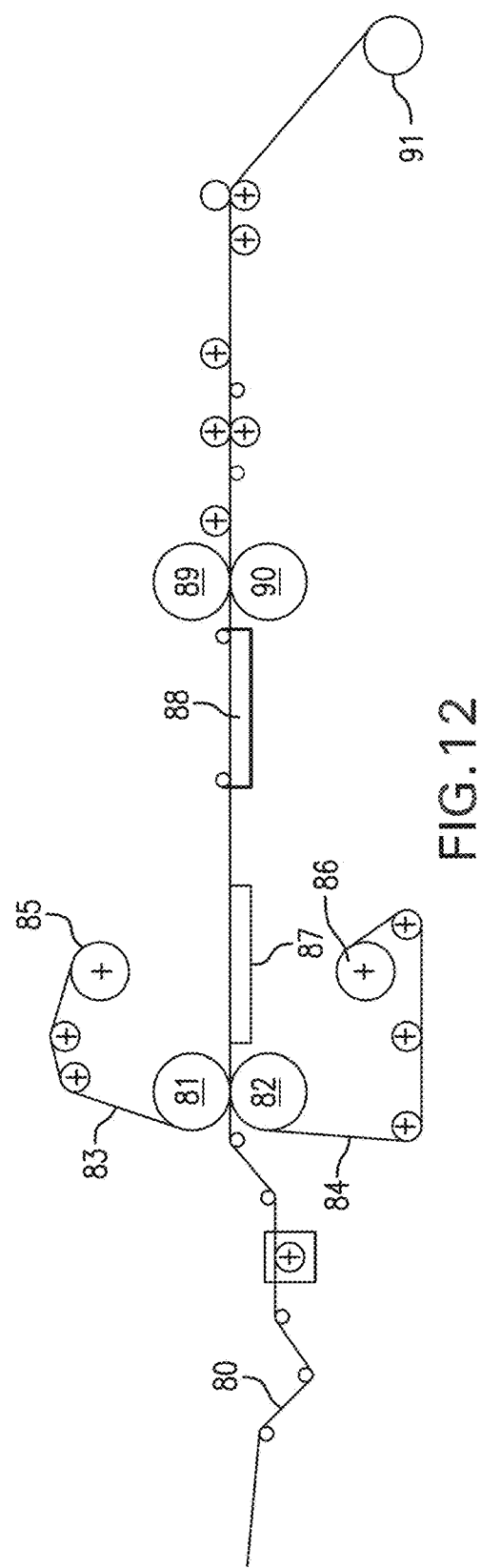
FIG. 12 illustrates an exemplary prepregging system that is capable of manufacturing a prepreg fabric.

FIG. 12 schematically shows an exemplary prepregging system that is capable of manufacturing a prepreg fabric and providing an in-situ thermal treatment. Referring to FIG. 12, a continuous fabric web 80 is conveyed to a first pressure nip formed by a pair of heated pressure rollers 81, 82. The fabric web 80 is sandwiched between two resin films 83, 84, which are unwound from supply rollers 85, 86. Each of the resin films 83, 84 is formed on a continuous release paper. The resin films 83, 84 are pressed onto the top and bottom faces, respectively, of the fabric web 80 with the aid of pressure rollers 81, 82. Pressure and heat from the pressure rollers 81, 82 causes the resin films 83, 84 to partially impregnate the fabric web 80, thereby forming a partially impregnated prepreg. The partially impregnated prepreg then passes over a heating plate 87. At this point, heating is carried out to create openings in the prepreg. After thermal treatment, the resulting porous prepreg is conveyed over a cooling plate 88, where the porous prepreg is cooled to solidify the resin. The cooled prepreg is then conveyed by pull rollers 89, 90 and guided by additional guide rollers to a winding roll 91 where it is wound up. This type of process is particularly suitable for creating openings in a prepreg that is based on the use of a plain weave fabric, particularly, low GSM fabrics where the thermal treatment is rapid due to thinness of fabric and impregnating film(s).

The openings formed in the heat-treated prepregs are irregular in shape and are not uniform in sizes. The shapes and sizes of the openings depend on the weaving pattern and the thermal treatment time. The size of the openings increases as resin flow progresses with time. As examples, the openings may be substantially circular cross-section with diameter within the range of 0.1-3 mm or approximately rectangular in cross-section with width and length within the range of 0.1 mm-3 mm. Furthermore, after certain amount of treatment time, as example, treatment time of 1-8 minutes may be sufficient to create the openings. Moreover, after certain treatment time period, some openings may become connected to each other, depending on the initial proximity of the openings to each other. In some instances, some entrapped air pockets may not open due to imperfect processing conditions, for example, when the release paper is not adhering to the resin film during thermal treatment.

Matrix Resin

The matrix resin for producing the curable prepreg described herein is based on a curable hot-melt composition, characterized in that it is initially a solid or semisolid at approximately room temperature (20° C.-25° C.), becomes molten at an elevated temperature at which the material is applied, solidified upon cooling, and is hardenable by curing. Moreover, the matrix resin should have sufficient viscosity and wetting characteristics to allow the formation air pockets, and subsequently, the formation of openings over the air pockets with heat treatment. In one embodiment, the hot-melt resin composition is a curable thermoset resin composition composed of one or more thermoset resins as the major component, and is substantially free of any organic solvent such as acetone, methyl ethyl ketone (MEK), dioxolane, alcohol. When used to produce a finished cured product, these thermoset resins are cured by the use of a catalyst or curing agent, heat or a combination of the two.

Suitable thermoset resins may include, but are not limited to, epoxies, unsaturated polyesters, bismaleimide, and combinations thereof. These thermoset resins can be fully cured by the use of heat, or a curing agent, or a combination thereof. Catalysts may be used to accelerate the curing reaction. When thermoset resins are fully cured, they become hardened and cannot be converted back to their original form.

In one embodiment, the matrix resin is an epoxy-based thermoset composition which contains one or more multifunctional epoxy resins as the main polymeric component. Suitable epoxy resins include polyglycidyl derivatives of aromatic diamine, aromatic mono primary amines, aminophenols, polyhydric phenols, polyhydric alcohols, polycarboxylic acids. Examples of suitable epoxy resins include polyglycidyl ethers of the bisphenols such as bisphenol A, bisphenol F, bisphenol S and bisphenol K; and polyglycidyl ethers of cresol and phenol based novolacs.

Suitable bismaleimide resins may include N,N'bismaleimides of 1,2 ethanediamine, 1,6-hexanediamine, trimethyl-1,6-hexanediamine, 1,4-benzene-diamine, 4,4'-methylenebisbenzenamine, 2-methyl-1,4-benzenediamine, 3,3'-methylenebisbenzenamine, 3,3'sulfonylbisbenzenamine, 4,4'-sulfonyl-bisbenzenamine, 3,3'oxybisbenzenamine, 4,4'oxybisbenzenamine, 4,4'-methylenebiscyclohexanamine, 1,3-benzenedimethanamine, 1,4-benzene-dimethanamine, and 4,4'-cyclohexanebisbenzenamine and mixtures thereof.

The matrix resin may further include, in minor amounts, thermoplastic materials such as polysulphones, polyether sulphones, polyether ketones (e.g. polyether ketone (PEK), polyether ether ketone (PEEK), polyether ketone ketone (PEKK) and the like), combinations thereof, and precursors thereof. One or more thermoplastic materials are added to the matrix resin to increase the toughness, tackiness and drapability of the prepreg.

The matrix resin, as discussed herein, may further comprise additives, in minor amounts, to influence one or more of mechanical, rheological, electrical, optical, chemical, and/or thermal properties of the matrix. Such additives may further comprise materials that chemically react with the matrix, interact with the matrix, or are unreactive with the matrix. Examples of additives may include, but are not limited to, toughening particles, flame retardants, ultraviolet (UV) stabilizers, antioxidants, colorants, and fillers (e.g., fumed silica, alumina, calcium carbonate, talc) to enhance one or more of damage tolerance, toughness, wear resistance.

The prepregs with surface openings (i.e. porous prepregs), as disclosed herein, are configured to enable dimensional stability of the openings. The openings, once formed, may remain dimensionally stable for a selected period of time. In certain embodiments, the openings may remain dimensionally stable during storage of the porous prepregs. The dimensional stability may be provided by tailoring the viscosity of the matrix resin. The matrix resin is formulated to form dimensionally stable openings at about room temperature, but the resin is capable of flowing at an elevated temperature during consolidation or curing to fill out the openings.

"Full impregnation", as discussed herein, refers to embedding substantially all of the fabric fibers within the matrix resin. "Partial impregnation", as discussed herein, refers to impregnation that is less than full impregnation, whereby there are regions of dry fibers that are not embedded within the matrix resin. In a preferred embodiment, the matrix resin is applied to both surfaces of the fabric ply, but the resin penetrates only partially through the thickness of the fabric so as leave a middle section of the fabric, in the thickness direction, substantially free of resin.

The term "dimensional stability" as used herein refers to the ability of a structure to maintain dimension within a selected range for a selected period of time. In certain embodiments, the selected range may be determined by the ability of the structure to perform an intended function, such as allowing the passage of a gas at a selected rate under a selected pressure.

The term "room temperature" as used herein refers to temperatures within the range of 20° C. to 25° C.

Prepreg Layups and Composite Parts

To form a composite part, a plurality of curable prepregs disclosed herein may be laid up into a prepreg layup, and then the layup is consolidated and cured. Consolidation and curing may be performed in a single stage or separately.

It has been discovered that the prepregs with surface openings (i.e. porous prepregs) facilitate the removal of gases from individual prepregs and prepreg layup containing one or more porous prepregs therein prior to and/or during consolidation, and thus reduce the volume of porosity within composites formed therefrom, as compared to composites formed without porous prepregs. For example, the openings provide escape routes for gases from within the porous prepregs and enable the gases to be removed from the prepregs with greater ease and in greater volume as compared with un-treated prepregs. The gases may include gases that originate from within the matrix resin or resin-free zone of the partially impregnated prepreg, or gases that originate from the interlayer region between prepreg layers. In particular, the porous prepregs enable the removal of gases that may evolve from the resin composition during consolidation.

The term "prepreg layup" as used herein refers to a plurality of prepregs that are placed adjacent one another in a stacking arrangement. In certain embodiments, the prepregs within the layup may be positioned in a selected orientation with respect to one another. In a further embodiment, the prepregs may optionally be stitched together with a threading material in order to inhibit their relative motion from a selected orientation. In additional embodiments, "layups" may comprise any combination of fully impregnated prepregs, partially impregnated prepregs, and porous prepregs as discussed herein. Layups may be manufactured by techniques that may include, but are not limited to, hand layup, automated tape layup (ATL), automated fiber placement (AFP) and filament winding.

Consolidation refers to a process that takes place under the action of one or more of heating, vacuuming, and applied pressure, whereby the matrix resin flows so as to displace void spaces. For example, consolidation may result in, but is not limited to, flow of resin into void spaces between fibers in the prepreg, void spaces between prepregs, and the like.

The terms "cure" and "curing" as used herein may include polymerizing and/or cross-linking processes. Curing may be performed by processes that include, but are not limited to, heating, exposure to ultraviolet light, and exposure to radiation. In further embodiments, the matrix resin within the porous prepreg may be formulated or partially cured in order to exhibit a selected stickiness or tack.

When a plurality of curable prepregs with surface openings are used in a prepreg layup, the layup possesses enhanced ability for the removal of gases (e.g. air) trapped within the prepregs and between prepreg plies. During consolidation of the prepreg layup, the openings and the resin-free regions within the prepregs provide various routes for gases trapped within the prepregs and between the prepregs to escape, thereby reducing the porosity within the resulting consolidated composite. Consequently, upon curing, the cured composite exhibits improved mechanical properties. For example, cured composites having residual porosity of less than 1 vol. %, on the basis of the total volume of the composite, may be achieved in this manner.

When openings are formed in both major surfaces of the curable prepreg, gases may travel through the prepreg by entering one surface and exiting through the opposite surface. The openings also allow for vacuum to fully penetrate the laminate stack of prepregs. Moreover, the openings create channels with adjacent crossover/under locations to create air passage along the interface of two adjacent prepreg plies. Various flow paths may be created by any combination of surface openings, the interlayer regions, and the non-impregnated (resin-free) portions of the prepregs. For example, gases from the interlayer region between adjacent prepregs may enter through openings on one side of a prepreg, and then through the resin-free middle section of the same prepreg in order to escape to the outside. Alternatively, the gases may flow from one interlayer region to the next interlayer region via openings in opposite sides of each prepreg, and eventually flow out of the prepreg layup. This is an improvement as compared to standard products without thermal treatment, because in a standard product where the resin film remains intact, it is more difficult to get air to transfer from between plies and into the ply core, whereas with the thermal-treated material, air transfer is enhanced due to the number of openings. These various flow paths greatly enhance the ability of entrapped gases to escape the prepreg layup and also create channels with adjacent up/down regions to create breathing along the interface of two adjacent plies.

The viscosity of the matrix resin may be controlled to flow and fill void spaces within and between the prepregs during consolidation. For example, in one embodiment, the viscosity of the matrix resin may be controlled by resin formulation to flow and fill void spaces upon application of heat, without external pressure. In another embodiment, the viscosity of the matrix resin may be controlled by resin formulation to flow and fill void spaces upon application of heat and external pressure, and optionally under vacuum. Beneficially, by allowing the openings and other void spaces to be filled during consolidation, the porosity of the resultant composite is substantially reduced or eliminated.

A vacuum bag setup may be employed to perform consolidation of the prepreg layup. In this setup, the curable prepreg layup may be placed in contact with a tool and then enclosed with an impervious membrane. The tool may have a relatively planar surface, curved surface, or other three-dimensional configuration. In one embodiment, a breather layer, such as an unimpregnated fiberglass sheet, may be positioned adjacent at least one of the horizontal surfaces of the layup for surface breathing. Sealant tapes may be further used, as necessary, to create an approximately vacuum tight seal between the tool and the membrane. To inhibit flow of the resin outside of the layup, or to improve gas flow, one or more dams may also be placed adjacent the edges of the layup. A perforated release film (e.g. perforated polyester film) may be inserted between the breather layer and the prepreg layup and a solid release film (e.g. polyester film) may be inserted between the prepreg layup and the tool in order to facilitate the removal of the consolidated composite from the setup. The enclosed volume is evacuated and the layup is heated up slowly to cause consolidation. Heating may be applied by placing the vacuum bag setup in an oven or an autoclave. Moreover, heating may be carried out with pressure (e.g. in an autoclave) or without pressure (e.g. within an oven), in order to lower the viscosity of the matrix and induce pressure differentials that allow the matrix resin to flow. The resin flow may fill the void spaces within the prepreg layup and displace gases from the layup when the viscosity of the matrix is sufficiently low in order to facilitate consolidation. Consequently, the layup is cured at a more elevated temperature within the same autoclave or oven to produce a final composite part.

Figure 13:
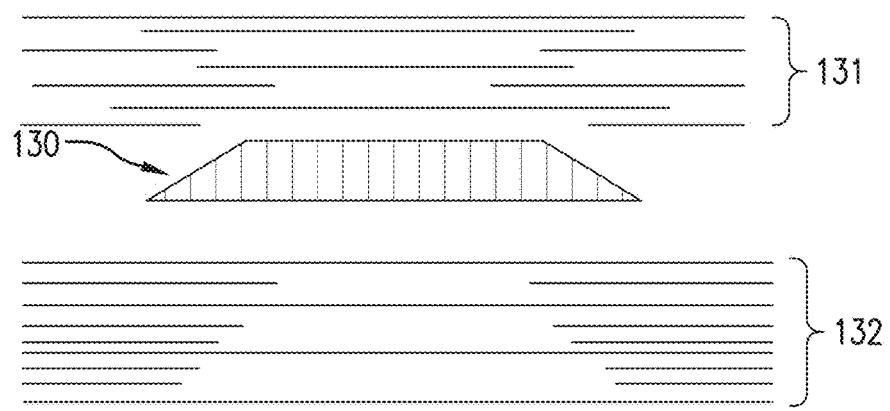
FIG. 13 schematically shows a configuration for assembling a honeycomb core sandwich structure according to an example.
Figure 14:
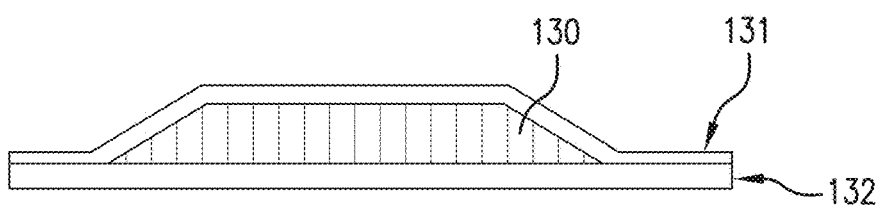
FIG. 14 schematically shows the honeycomb core sandwich structure produced from the assembly shown in FIG. 13.

A composite sandwich structure may be produced using the porous prepregs disclosed herein. In one embodiment, a center core 130 composed of wood, foam, honeycomb, or other structural materials is sandwiched between two prepreg layups 131, 132, as shown in FIG. 13, wherein some or all of the prepreg plies in the layup contain surface openings. The resulting composite sandwich structure is illustrated by FIG. 14. Optionally, doubler layers may be placed between porous prepreg plies so as to create elongated reinforcing regions. Furthermore, unimpregnated, or partially impregnated lightweight scrims, such as fiberglass, carbon, thermoplastic or other materials woven or unwoven, may be introduced within the layups in selected localities in order to facilitate the removal of gases or to increase mechanical properties such as damage tolerance.

When the prepreg layup incorporates a core structure, an adhesive material may also be employed in order to bond the core to the prepreg material prior to curing of the prepreg layup. As open center core structures, such as honeycomb structure, may contain a significant amount of gases, the adhesive layer may also be perforated in order to facilitate removal of the gases.

The thermal treatment disclosed herein may be incorporated into the composite part manufacturing process at a parts builder, either before or during layup. The heat treatment of any prepreg ply could be carried out in-situ during the prepreg layup process by applying heat to a prepreg material or ply before it is laid down, as it is being laid down, or after a prepreg ply has been laid down, and prior to the placement of a subsequent next ply. For example, the process may include: laying down a prepreg ply covered on one surface with a release paper or polyester film; heat treatment using a heated roller, hot air wand, hot iron, etc., to form surface openings; removing the release paper/polyester film; laying down the next prepreg ply; and repeated as necessary until a prepreg layup of desired thickness is formed.

EXAMPLES

The following examples are provided to demonstrate the benefits of the embodiments of the disclosed curable prepregs. These examples are discussed for illustrative purposes and should not be construed to limit the scope of the disclosed embodiments.

Example 1

Figure 15:
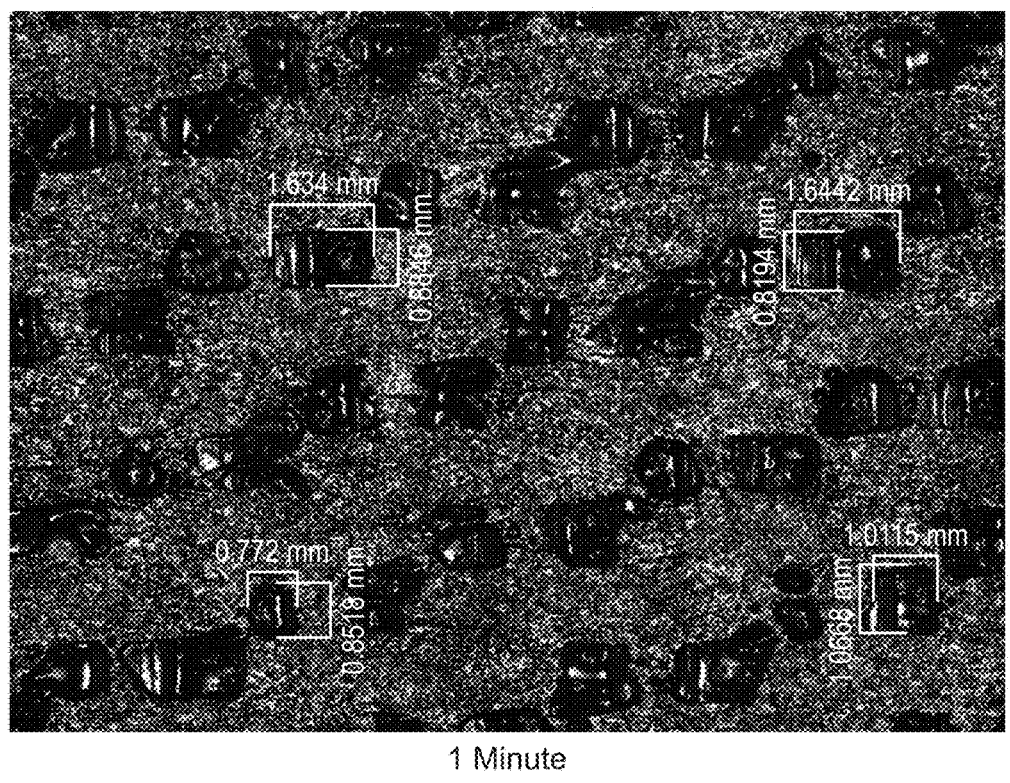
FIGS. 15-17 are micrographs showing a top-view image of a heat-treated prepreg surface at 1 minute, 4 minutes, and 7.5 minutes, respectively, wherein the prepreg was produced using a satin weave fabric according to one example.
Figure 16:
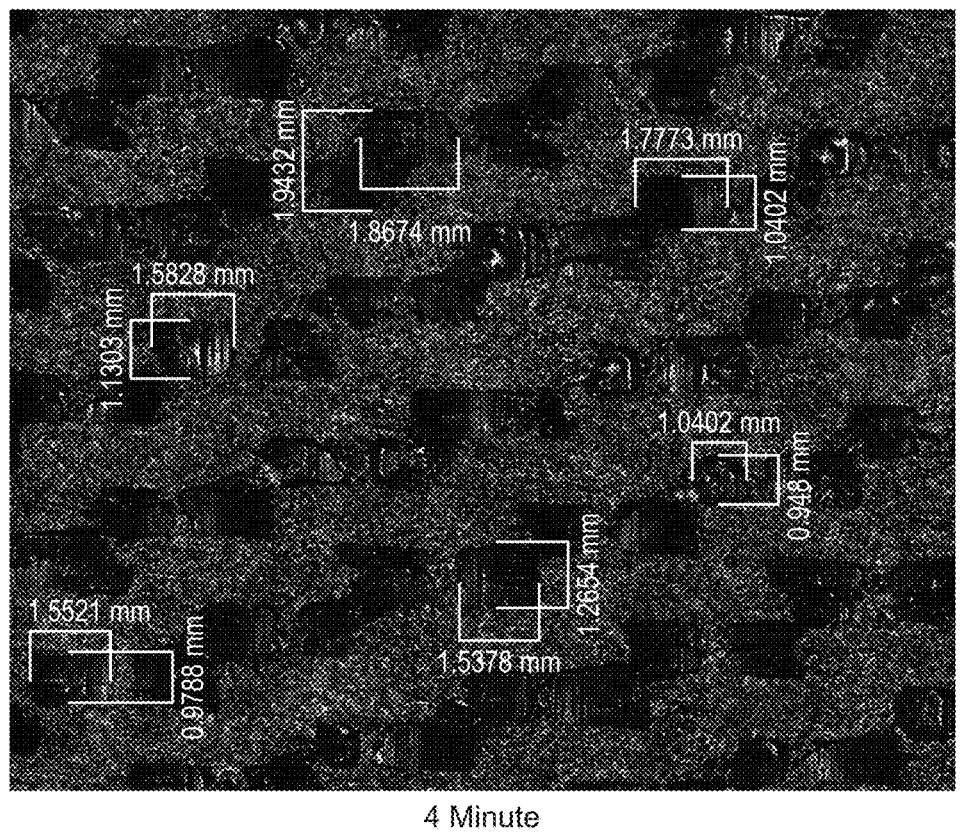
Figure 17:

A prepreg fabric was prepared by a hot-melt process using a prepregging machine, in which two resin films formed from a toughened epoxy-based resin, Cycom 5320 (available from Cytec Industries Inc.) are pressed against the top and bottom surfaces of an 8-Harness satin weave, carbon-fiber fabric, whereby the fabric is sandwiched between the two resin films. Each resin film was formed on a silicone coated release paper and has an areal unit weight of 106 gsm per film. The carbon-fiber fabric has a FAW of (370) gsm and thickness of 0.0146 in. Heat and pressure were applied to the laminate to cause the resin films to melt and penetrate partially through the thickness of the fabric. One of the release papers was replaced with a smooth polyester film after prepregging to facilitate winding onto a roll. The pre-impregnated prepreg with the release paper on top and polyester film underneath was heated in an oven for 2-5 minutes at 200° F. (93° C.). This heat cycle time has been found to be sufficient for opening up the enclosed air pockets without impacting the mechanical or physical characteristics of the prepreg. FIGS. 15-17 show the top-view image of the prepreg surface, with the release paper removed, at 1 minute, 4 minutes and 7.5 minutes, respectively, of heating time. The openings coincided with the crossover/under locations (i.e. up/down tow portions) in the satin weave fabric. As can be seen from FIGS. 15-17, the sizes of the openings became larger over time. After 7.5 minutes, some openings, which were aligned in the same row and adjacent to crossover/under locations of the adjacent tows were touching each other, as can be seen from the image of FIG. 13. These openings correspond to the up/down tow portions in the satin weave fabric (as indicated by reference number 70 in FIG. 7). It was noted that the openings were formed in only the release paper side of the heat-treated prepreg.

Example 2

Figure 18:
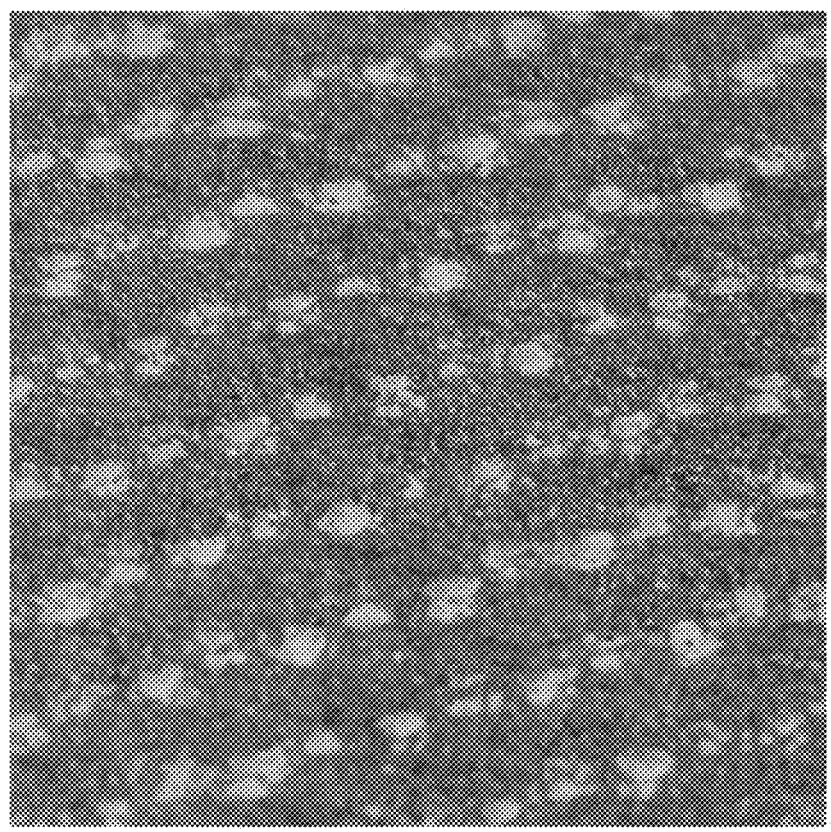
FIG. 18 is a micrograph showing the top-view image of a heat-treated prepreg surface, wherein the prepreg was produced using a plain weave fabric according to another example.

A prepreg fabric was prepared by using the prepregging system depicted in FIG. 12. The fabric used was a plain weave carbon-fiber fabric, and the resin films applied to opposite sides of the fabric were formed from Cycom 5320 epoxy-based resin. Each resin film was formed on a silicone coated release paper and has an areal unit weight of 55 gsm. The carbon-fiber fabric has a FAW of 190 gsm and thickness of 0.0083". For partial impregnation, 20 psi was applied at the first nip; 220° F. (104° C.) was the temperature at the heating plate; and a gap of less than 0.5 in (12.7 mm) was provided at the second nip to limit compaction force. FIG. 18 shows the top-view image of the heat-treated prepreg surface with the release paper removed. The openings in the prepreg surface coincide with the interstices in the plain weave fabric. Furthermore, it was noted that the openings were formed in both major surfaces of the heat-treated prepreg.

Example 3

Figure 19:
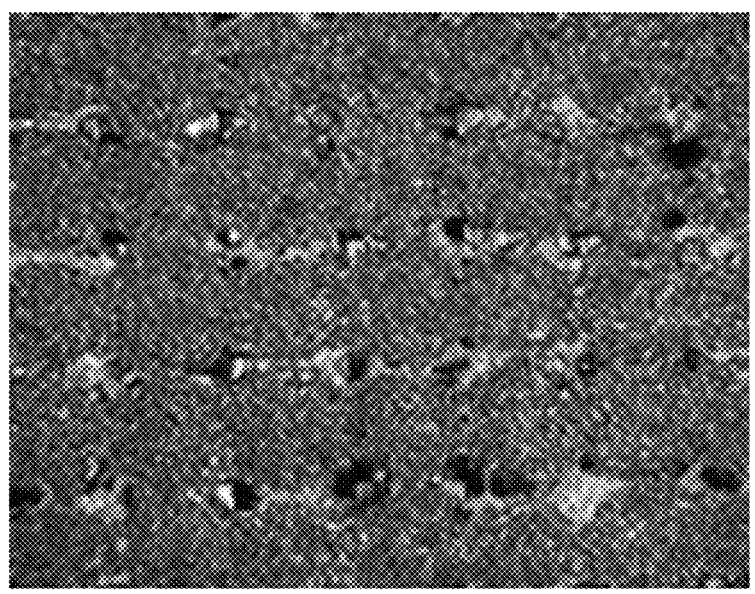
FIG. 19 is a micrograph showing the top-view image of a cured prepreg surface with air bubbles formed beneath the surface.

For comparison, a control prepreg was prepared as described in Example 1 without the thermal post-treatment for creating surface openings. FIG. 19 shows the resulting prepreg surface with enclosed air bubbles formed beneath the continuous resin film. These air bubbles correspond to the up/down tow portions in the satin weave fabric. Thus, it can be seen that, without the heat treatment before curing, entrapped air from air pockets, and air in between plies that cannot escape remained in the resulting cured prepreg due to the fact that the continuous resin film limits the removal of air from the prepreg.

Example 4

Figure 20:
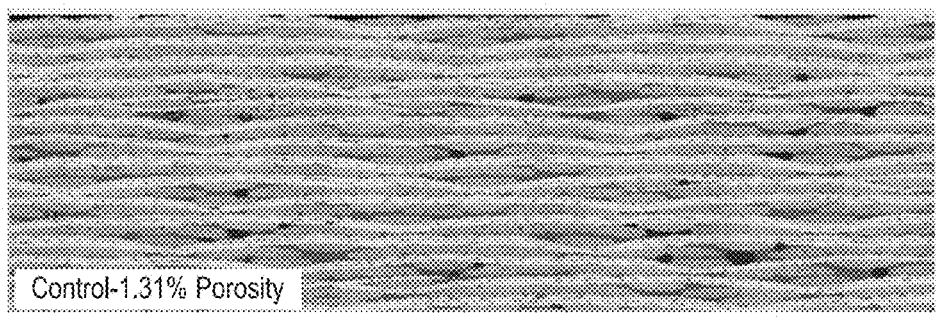
FIG. 20 shows the cross-section view of a cured composite panel consisted of untreated prepreg material.
Figure 21:
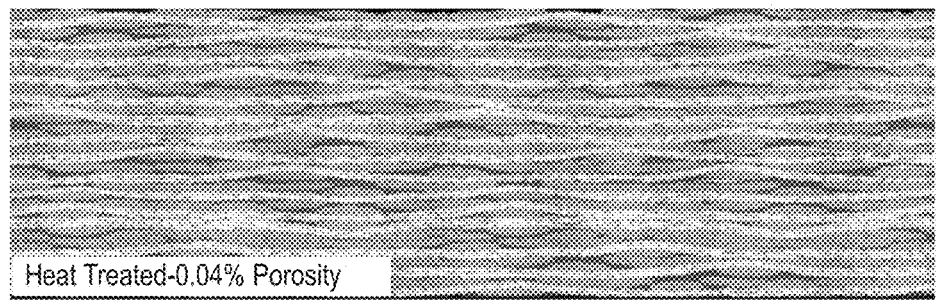
FIG. 21 shows the cross-section view of a cured composite panel consisted of heat-treated prepreg material.

A 12"×12" monolithic panel consisting of 15 plies of 5320/8HS prepreg material as described in Example 1 was constructed and cured. For comparison, the same panel was constructed using untreated 5320/8HS prepreg material and cured under the same conditions. The resulting porosity was reduced from 1.31% without treatment to 0.04% with heat-treatment. FIG. 20 shows the cross-section of the panel consisted of material without treatment, and FIG. 21 shows the cross-section of the panel consisted of heat-treated material.

Example 5

A honeycomb core sandwich structure was assembled based on the configuration shown FIG. 13, wherein 10 porous prepreg plies (201) were placed over a honeycomb core (202) and 14 porous prepreg plies (203) were placed under the honeycomb core. The porous prepreg plies were produced by partially impregnating satin weave, carbon fiber fabric with Cycom 5320 resin, followed by thermal treatment to create surface openings as described in Example 1. The assembled sandwich structure was vacuum bagged, consolidated at room temperature and cured in an oven (not autoclave).

For comparison, a standard honeycomb core sandwich structure was assembled, consolidated and cured in the same manner except that the prepreg plies were not thermally treated to create surface openings.

Porosity was measured at different sections of the cured product, including flange, bevel sections, central core, and an average porosity was calculated. Porosity was measured by visual microscopy of polished panel cross sections The cured product resulting from using porous prepregs was found to contain about 0.05% porosity on average, as compared to 2.0% porosity for the cured, standard product.

Example 6

A honeycomb core sandwich structure was assembled using porous prepreg plies and was based on the configuration of FIG. 13. The porous prepreg plies used for this structure were composed of plain weave, carbon fiber fabric and Cycom 5320 resin, and the openings in the prepreg plies were produced by in-situ heating during the prepregging process as described in Example 2. Subsequently, the assembled sandwich structure was vacuum bagged, consolidated at room temperature and cured in an oven (not autoclave). For comparison, a standard honeycomb core sandwich structure was assembled, consolidated and cured in the same manner except that the prepreg plies were not thermally treated to create surface openings.

The cured product resulting from using porous prepregs was found to contain about 0.18% porosity on average, as compared to 1.74% porosity for the cured, standard product.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

The terms "approximately", "about" and "substantially" as used herein represent an amount close to the stated amount that still performs the desired function or achieves the desired result. For example, the terms "approximately", "about", and "substantially" may refer to an amount that is within less than 10% of, within less than 5% of, within less than 1% of, within less than 0.1% of, and within less than 0.01% of the stated amount.

What is claimed is:

1. A curable prepreg produced by a method comprising:
   providing a woven fabric having two opposing faces and a plain weave pattern in which a tow in a first weaving direction passes over another tow in a second weaving direction, then pass under an adjacent tow in the second weaving direction, and interstices are defined between adjacent tows, wherein the woven fabric has an areal weight of 100-600 gsm;
   partially impregnating the woven fabric with a curable, hot-melt resin such that a continuous resin film covers each face of the fabric and penetrates partially through the thickness of the fabric leaving an inner section of the fabric, in the thickness direction, substantially free of said resin, wherein each resin film has a film weight of 10-200 gsm:
   heating the partially impregnated fabric so that the resin film on each face of the fabric becomes flowable, and subsequently, portions of the resin film over the air pockets at the interstices break open, creating openings in the resin film that correspond to locations of the interstices, wherein the locations of the openings are dependent on the plain weave pattern, and
   each opening exposes a single interstice in the fabric and is configured to create a fluid flow path from the inner section of the fabric to at least one outer surface of the prepreg, from at least one outer surface of the prepreg to the inner section, from one outer surface of the prepreg to an opposite outer surface, or combination thereof.

2. The curable prepreg of claim 1, wherein the hot-melt resin film is substantially solid at a temperature within the range of 20° C.-25° C. and becomes flowable at an elevated temperature below an onset curing temperature of the resin film.

3. The curable prepreg of claim 1, wherein the hot-melt resin film comprises one or more thermoset resins as a major component, and is substantially free of any organic solvent.

4. The curable prepreg of claim 1, wherein the hot-melt resin film comprises one or more epoxy resins, a curing agent, and at least one thermoplastic or elastomeric compound.

5. The curable prepreg of claim 1, wherein each tow comprises a plurality of fiber filaments, which are formed of a material selected from: glass, carbon, aramid, polyethylene (PE), boron, quartz, basalt, ceramic, polyester, poly-p-phenylene-benzobisoxazole (PBO), and combinations thereof.

* * * * *